US011556749B2

United States Patent
Wu et al.

(10) Patent No.: US 11,556,749 B2
(45) Date of Patent: Jan. 17, 2023

(54) DOMAIN ADAPTATION AND FUSION USING WEAKLY SUPERVISED TARGET-IRRELEVANT DATA

(71) Applicant: Siemens Mobility GmbH, Munich (DE)

(72) Inventors: Ziyan Wu, Princeton, NJ (US); Kuan-Chuan Peng, Plainsboro, NJ (US); Jan Ernst, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 630 days.

(21) Appl. No.: 16/611,297

(22) PCT Filed: May 11, 2018

(86) PCT No.: PCT/US2018/032197
§ 371 (c)(1),
(2) Date: Nov. 6, 2019

(87) PCT Pub. No.: WO2018/213108
PCT Pub. Date: Nov. 22, 2018

(65) Prior Publication Data
US 2020/0065634 A1 Feb. 27, 2020

Related U.S. Application Data

(63) Continuation of application No. 15/720,424, filed on Sep. 29, 2017, now abandoned.
(Continued)

(51) Int. Cl.
*G06K 9/62* (2022.01)
*G06N 3/02* (2006.01)
(Continued)

(52) U.S. Cl.
CPC ......... *G06K 9/6292* (2013.01); *G06K 9/6257* (2013.01); *G06K 9/6273* (2013.01);
(Continued)

(58) Field of Classification Search
CPC .. G06K 9/6292; G06K 9/6257; G06K 9/6273; G06K 9/6288; G06N 3/02;
(Continued)

(56) References Cited

U.S. PATENT DOCUMENTS

2007/0223807 A1 9/2007 Yankelevitz et al.
2012/0179704 A1* 7/2012 Xu ..................... G06F 16/355
707/766
(Continued)

OTHER PUBLICATIONS

Chen, T. H., Liao, Y. H., Chuang, C. Y., Hsu, W. T., Fu, J., & Sun, M. (Oct. 2017). Show, Adapt and Tell: Adversarial Training of Cross-domain Image Captioner. In the IEEE International Conference on Computer Vision (ICCV) (vol. 2).
(Continued)

*Primary Examiner* — Ali Bayat

(57) ABSTRACT

Aspects include receiving a request to perform an image classification task in a target domain. The image classification task includes identifying a feature in images in the target domain. Classification information related to the feature is transferred from a source domain to the target domain. The transferring includes receiving a plurality of pairs of task-irrelevant images that each includes a task-irrelevant image in the source domain and in the target domain. The task-irrelevant image in the source domain has a fixed correspondence to the task-irrelevant image in the target domain. A target neural network is trained to perform the image classification task in the target domain. The training is based on the plurality of pairs of task-irrelevant images. The image classification task is performed in the target domain and
(Continued)

includes applying the target neural network to an image in the target domain and outputting an identified feature.

14 Claims, 11 Drawing Sheets

Related U.S. Application Data

(60) Provisional application No. 62/528,690, filed on Jul. 5, 2017, provisional application No. 62/506,128, filed on May 15, 2017.

(51) Int. Cl.
    *G06N 3/08*     (2006.01)
    *G06N 3/04*     (2006.01)
    *G06V 10/44*     (2022.01)

(52) U.S. Cl.
    CPC .............. *G06N 3/02* (2013.01); *G06N 3/0454* (2013.01); *G06N 3/08* (2013.01); *G06V 10/454* (2022.01)

(58) Field of Classification Search
    CPC ...... G06N 3/0454; G06N 3/08; G06V 10/454; G06V 10/764; G06V 10/7747; G06V 10/80; G06V 10/809; G06V 10/82
    USPC ........................................................ 382/158
    See application file for complete search history.

(56) References Cited

U.S. PATENT DOCUMENTS

| | | | |
|---|---|---|---|
| 2013/0171631 A1* | 7/2013 | Becker ................ | C12Q 1/6806 435/6.12 |
| 2018/0121768 A1* | 5/2018 | Lin ...................... | G06K 9/6215 |
| 2018/0129917 A1* | 5/2018 | Chu ....................... | G06V 20/48 |
| 2018/0253627 A1* | 9/2018 | Baradel ................ | G06K 9/6271 |

OTHER PUBLICATIONS

Yang, X., Ramesh, P., Chitta, R., Madhvanath, S., Bernal, E. A., & Luo, J. (2017). Deep Multimodal Representation Learning From Temporal Data. In Proceedings of the IEEE Conference on Computer Vision and Pattern Recognition (pp. 5447-5455).

Song, S., Lichtenberg, S. P., & Xiao, J. (Jun. 2015). Sun RGB-D: A RGB-D scene understanding benchmark suite. In CVPR (vol. 5, p. 6).

Deng J. et. al., "Imagenet: A large-scale hierarchical image database", Computer Vision and Pattern Recognition, Conference on. IEEE, 2009.

Szegedy C. et. al., "Going deeper with convolutions", CoRR abs/1409.4842. URL http://arxiv. org/abs/1409.4842.

Gabin Yaroslav et al: "Domain-adversarial training of neural networks", The Journal of Machine Learning Research, vol. 17, pp. 2096-2030 XP002789597, abstract, itmes 2, 3, 4.1, 4.2.

Ngiam, J., Khosla, A., Kim, M., Nam, J., Lee, H., & Ng, A. Y. (2011). Multimodal deep learning. In Proceedings of the 28th international conference on machine learning (ICML-11) (pp. 689-696).

Tzeng, E., Hoffman, J., Saenko, K. and Darrell, T., 2017. Adversarial Discriminative Domain Adaptation. arXiv preprint arXiv:1702.05464.

BAIR/BVLC GoogleNet model. http://dl.caffe.berkeleyvision.org/bvlc_googlenet.caffemodel; 2017.

Janoch, A., Karayev, S., Jia, Y., Barron, J. T., Fritz, M., Saenko, K., & Darrell, T. A category-level 3-D object dataset: Putting the Kinect to work. In 2011 IEEE International Conference on Computer Vision Workshops (ICCV Workshops).

Silberman, Nathan, et al. "Indoor segmentation and support inference from RGBD images." Proceedings of the 12th European conference on Computer Vision—vol. Part V. Springer-Verlag, 2012.

Jia Y. et. al., "Caffe: Convolutional architecture for fast feature embedding", In Proceedings of the 22nd ACM International conference on Multimedia (pp. 675-678). ACM.

NPL search report, Google, 2017.

Tzeng, E., Hoffman, J., Darrell, T., & Saenko, K. (Dec. 2015). Simultaneous deep transfer across domains and tasks. In Computer Vision (ICCV), 2015 IEEE International Conference on (pp. 4068-4076). IEEE.

Csurka, Gabriela. "Domain adaptation for visual applications: A comprehensive survey." arXiv preprint arXiv:1702.05374 (2017).

Xiao, J., Owens, A., & Torralba, A. (Dec. 2013). Sun3d: A database of big spaces reconstructed using sfm and object labels. In Computer Vision (ICCV), 2013 IEEE International Conference on (pp. 1625-1632). IEEE.

International Search Report dated Aug. 28, 2018; PCT Application No. PCT/US2018/032197; Filing Date: May 11, 2018; 14-pages.

Kuan-Chuan Peng et al: "Zero-Shot Deep Domain Adaptation", arxiv.org, Cornell University Library, 201 Olin Library Cornell University Ithaca, NY 14853, Jul. 6, 2017 (Jul. 6, 2017), XP080774906 / Jul. 6, 2017.

Hoffman Judy et al: "Cross-modal adaptation for RGB-D detection", 2016 IEEE International Conference on Robotics and Automation (ICRA), IEEE, May 16, 2016 (May 16, 2016), pp. 5032-5039 / May 16, 2016.

Gupta Saurabh et al: "Cross Modal Distillation for Supervision Transfer", 2016 IEEE Conference on Computer Vision and Pattern Recognition (CVPR), IEEE, Jun. 27, 2016 (Jun. 27, 2016), pp. 2827-2836 XP033021463 / Jun. 27, 2016.

Castrejon Lluis et al: 11 Learning Aligned Cross-Modal Representations from Weakly Aligned Data, 2016 IEEE Conference on Computer Vision and Pattern Recognition (CVPR), IEEE, Jun. 27, 2016 (Jun. 27, 2016), pp. 2940-2949 / Jun. 27, 2016.

Hoffman Judy et al: "Learning with Side Information through Modality Hallucination", 2016 IEEE Conference on Computer Vision and Pattern Recognition (CVPR), IEEE, Jun. 27, 2016 (Jun. 27, 2016), pp. 826-834 / Jun. 27, 2016.

* cited by examiner

DOMAIN ADAPTATION AND FUSION USING WEAKLY SUPERVISED TARGET-IRRELEVANT DATA

CROSS-REFERENCE TO RELATED APPLICATION

This application is a national phase filing under 35 U.S.C. § 371 of International Patent Application No. PCT/US2018/032197, filed May 11, 2018, which claims the benefit of U.S. patent application Ser. No. 15/720,424, filed Sep. 29, 2017, which claims priority to U.S. Provisional Patent Application Ser. No. 62/506,128, filed May 15, 2017 and 62/528,690, filed Jul. 5, 2017 which are incorporated herein by reference in their entirety.

BACKGROUND

The subject matter described herein relates in general to domain adaptation and fusion, and more specifically, to performing domain adaption and fusion using weakly supervised target-irrelevant data.

The shortage of labeled data for training classifiers in specific domains is a significant problem in machine learning applications since the cost of acquiring data labels is often high. Domain adaptation is one way to address this problem by leveraging labeled data in one or more related domains, often referred to as "source domains," when learning a classifier for labeling unseen data in a "target domain." The source and target domains are typically related but not identical.

However, for classifier models that are learned on source domains, the performance in the target domain tends to be poor. This is especially true in computer vision applications where existing image collections used for object categorization present specific characteristics which often prevent a direct cross-dataset generalization. One reason is that even when the same features are extracted in both domains, the underlying causes of the domain shift (such as changes in the camera, image resolution, lighting, background, viewpoint, and post-processing) can strongly affect the feature distribution. Thus, the assumptions of the classifier trained on the source domain do not always hold for the target domain.

Similarly, corporate document collections, such as emails, orders, invoices, and reports, may have the same class labels but the document content and layout may vary considerably from one customer to another. Accordingly, adapting a document (image) classifier model from one customer to another may not yield a sufficiently good accuracy without significant amounts of costly labeled data in the target domain.

The useful information to solve practical tasks often exists in different domains captured by various sensors, where a "domain" can be either a modality or a dataset. For instance, the three-dimensional (3D) layout of a room can be either captured by a depth sensor or can be inferred from red, green, and blue (RGB) images. In real-world scenarios, most of the time only a limited amount of data in certain domain(s) is available for access. This limited amount of data is often a challenge faced by domain adaptation where a source domain, a target domain, and a task of interest (TOI) are given. A natural extension of the end product of domain adaptation, that is a source-domain TOI solver and a target-domain TOI solver, is domain fusion, where the typical end objective is to obtain a dual-domain (source and target) task solver, which is robust to noise in either domain.

Contemporary domain adaptation methods assume that the task-relevant data, that is the data directly applicable and related to TOI, in the target domain is available at training time, which is not always true in practice. For example, acquiring the depth image inside a small delicate component may be infeasible due to not having the suitable tool at hand and/or due to time/budget limitation. A similar assumption that the task-relevant data is available is also made by contemporary domain fusion methods.

Recent progress in computer vision has been dominated by deep neural networks trained with large amount of labeled data. Collecting and annotating such datasets can be a tedious task, and in some contexts an impossible task. This has led to a recent surge in approaches that rely solely on synthetically generated data from 3D models for their training, for example depth or 2.5-dimensional (2.5D) data. However, for certain modalities, it is also very difficult to synthesize data, such RGB images.

Accordingly, while domain adaptation and fusion methods are suitable for their intended purposes, what is needed is domain adaptation and fusion methods having certain features of embodiments of the present invention.

SUMMARY

Embodiments of the present invention include methods, systems, and computer program products for performing domain adaption and fusion using weakly supervised target-irrelevant data. A non-limiting example method includes receiving a request to perform an image classification task in a target domain. The image classification task includes identifying a feature in images in the target domain. Classification information related to the feature is transferred from a source domain to the target domain. The transferring includes receiving a plurality of pairs of task-irrelevant images that each includes a task-irrelevant image in the source domain and a task-irrelevant image in the target domain. The task-irrelevant image in the source domain has a fixed correspondence to the task-irrelevant image in the target domain. A target neural network is trained to perform the image classification task in the target domain. The training is based on the plurality of pairs of task-irrelevant images. The image classification task is performed in the target domain and includes applying the target neural network to an image in the target domain and outputting an identified feature.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
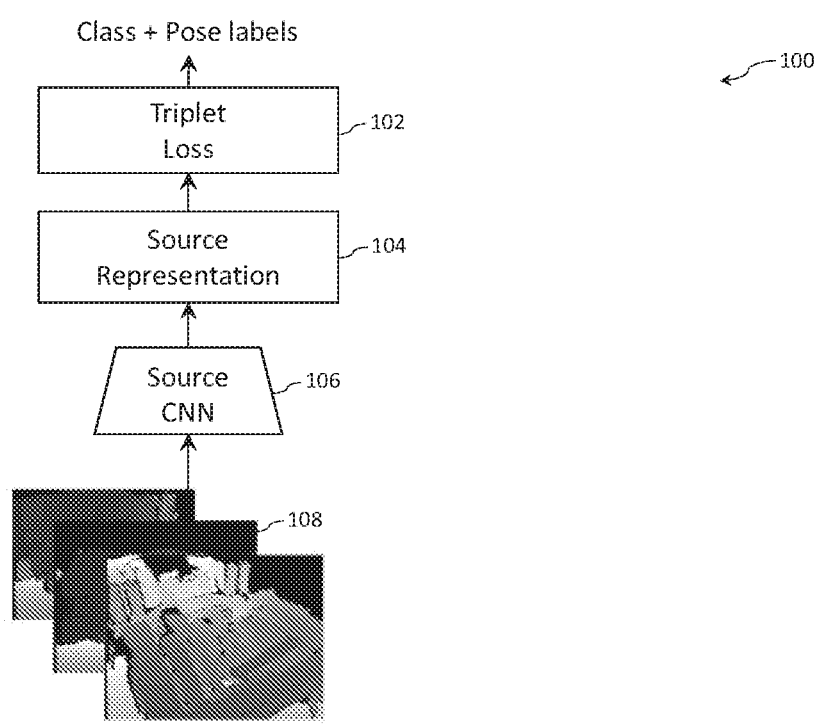
FIG. 1 is a flow diagram illustrating a method of training analytics in accordance with one or more embodiments of the present invention.

The detailed description explains embodiments of the invention, together with advantages and features, by way of example with reference to the drawings.

DETAILED DESCRIPTION

Embodiments of the present invention relate to a domain adaptation and fusion process, which learns from task-irrelevant dual-domain training pairs without using task-relevant target domain training data. One or more embodiments of the present invention described herein conduct domain adaptation, or transfer learning, where the learning is based on a source data distribution in a well performing model being applied to a different target data distribution. Contemporary approaches include different types of domain adaptation approaches such as, but not limited to: unsupervised domain adaptation, where a learning sample contains a set of labeled source examples, a set of unlabeled source examples, and an unlabeled set of target examples; semi-supervised domain adaptation that includes a small set of labeled target examples; and fully supervised domain adaptation, where all the examples considered are labeled.

In accordance with one or more embodiments of the present invention, a versatile approach is provided that can effectively transfer learned abstract features from one modality to another without requiring objective-relevant, or task-relevant, data from the target modality, while at the same time optimizing over the target objective. Based on the transfer of the learned abstract features, an approach to effectively learn a feature representation by fusing the source modality and target modality without using any task-relevant data from the target modality is provided to further enhance the performance of analytics.

As used herein, the term "source modality" or "source domain" refers to the modality that the abstract features are learned from and are to be transferred from. As used herein, the term "target modality" or "target domain" refers to the modality that the abstract features are to be transferred to.

As used herein, the term "task-relevant data" refers to data that is directly applicable and related to the end objective. For example, if the task is classifying images of cats and dogs, then any image, containing either a cat or a dog is considered to be task-relevant data. The term "task-relevant images" is used herein to refer to task-relevant data that includes images. As used herein, the term "task-irrelevant data" refers to data that is not applicable to the end objective and has no relation to the end objective. For example, if the task is classifying images of cats and dogs, then any image that does not contain either a cat or a dog is considered to be task-irrelevant data. The term "task-irrelevant images" is used herein to refer to task-irrelevant data that includes images.

In contemporary domain adaption approaches, data is required from the target domain. In most contemporary domain approaches (supervised, semi-supervised, or unsupervised), a large amount of target data is required, which in practice may be very difficult to obtain. Some contemporary semi-supervised and unsupervised domain approaches are based on adversarial learning which forces the samples from source and target domains to have a similar distribution into feature space. Contemporary approaches that are based on adversarial learning require at least a small amount of labeled data from the target domain to align the classes for the confusing domains.

One or more embodiments of the present invention described herein provide a process for conducting weakly supervised domain adaption where learned feature representation is transferred from one modality to another modality using only pairwise information from the two modalities. The pairwise information used in the adaptive learning can be any kind of fixed correspondences or relationship such as, but not limited to, spatial relation.

In accordance with one or more embodiments of the present invention a classifier/detector of a target modality is learned using only task-irrelevant data. Shared abstract features are extracted from source and target modalities by jointly optimizing over a target objective using task-irrelevant pairwise data pairs from source and target modalities.

One or more embodiments of the present invention include a process for learning a fused representation and a classifier of source and target modalities with training data only from a source modality. In the fusion learning, source modality and a source convolutional neural network (CNN) network can be used to simulate the input of the target modality in the target modality thread. In the source modality thread in fusion learning, the CNN is fine-tuned to explore effective unique (not shared by the target modality) abstract features in the source modality to further boost the fusion performance.

An example follows where one or more embodiments of the present invention is applied to object recognition data that has been collected using a red, green, and blue-depth (RGB-D) sensor to record color and depth. Embodiments of the present invention are not limited to object recognition nor to data that has been collected using a RGB-D sensor to record color and depth. Examples of other uses that embodiments of the present invention can be applied to include, but are not limited to: medical imaging using computed tomography (CT) and magnetic resonance imaging (MRI) images;

and object recognition using image data that has been collected using RGB and infrared sensors.

In accordance with one or more embodiments of the present invention, an integrated perception system (IPS) can be used to control and acquire data from visual sensors such as depth cameras, thermal cameras, and color cameras. In an embodiment the IPS system is implemented using a computer such as computer 906 of FIG. 9 or computer 1101 of FIG. 11. By fusing the data from different sensors, the IPS obtains and provides feedback about the targets being monitored as well as the environment (e.g., in a geographic location such as a building or park). In order to provide autonomous perception capabilities by the IPS, the use of real data from the task-specific scenes should be limited as much as possible. Engineering design data such as computer aided design (CAD) models can be used in place of or to supplement the task-specific scenes. With range sensors, geometry information can be easily and comprehensively obtained by rendering synthetic depth images from CAD data. However, for other modalities such as thermal and color cameras, adaptive learning may be required to transfer the knowledge.

Turning now to FIG. 1, a flow diagram 100 illustrating a method of training analytics in the depth domain is generally shown in accordance with one or more embodiments of the present invention. In an embodiment, the method shown in FIG. 1 is implemented using a computer such as computer 906 of FIG. 9 or computer 1101 of FIG. 11. As shown in FIG. 1, triplet loss 102 is fixed, and CNN 106 and source representation 104 are being trained using the process shown in FIG. 1. The flow diagram 100 shown in FIG. 1 includes training the source CNN 106 using synthetic rendering images 108. In an embodiment, the synthetic rendering images 108 include labeled depth data generated from CAD. In an embodiment, the source CNN 106 is trained with the synthetic rendering images 108 with the objective of the training being to recognize the class (or category) and the pose of the object in the image. The class and pose of the object are examples of discriminative abstract features in the depth domain. The source CNN 106 can be used to produce a source representation 104, implemented for example as a one dimensional feature vector. As shown in FIG. 1, class and pose labels are input to the triplet loss 102 for use in supervising the training. The triplet loss 102 is an objective function that provides feedback that is used to adjust the source CNN 106.

Figure 2:
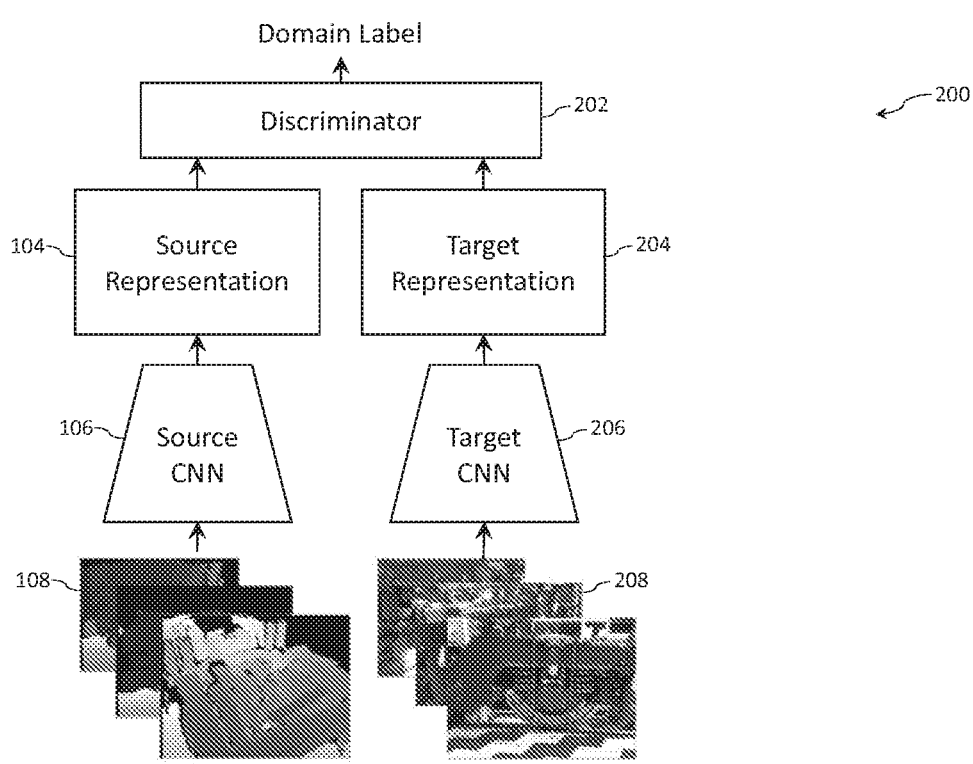
FIG. 2 is a flow diagram illustrating a method of domain adaptation.

Turning now to FIG. 2, a flow diagram 200 of a contemporary method of domain adaptation is generally shown. The processing shown in FIG. 2 takes a set of discriminative abstract features in the depth domain (i.e., the source domain) that were generated using a process such as that shown in FIG. 1, and transfers them to a different modality (i.e., the target domain). As shown in FIG. 2, source CNN 106, source representation 104, and discriminator 202 are fixed; and target CNN 206 and target representation 204 are being trained using the process shown in FIG. 2. In the example shown in FIG. 2, the target domain is RGB and RGB images 208 are input to train the target CNN 206. FIG. 2 shows the use of an adversarial learning process to adapt to the RGB domain. As shown in FIG. 2, a classifier shown as discriminator 202 outputs a domain label which is a zero or a one depending on which domain (target or source) the label comes from Using an adversarial learning process, such as that shown in FIG. 2 has been shown to be effective in domain adaptation even without much supervision. A drawback to the approach shown in FIG. 2 is that real RGB images 208 that are task-relevant are required to train the target CNN 206, and these images are often difficult to obtain.

Figure 3:
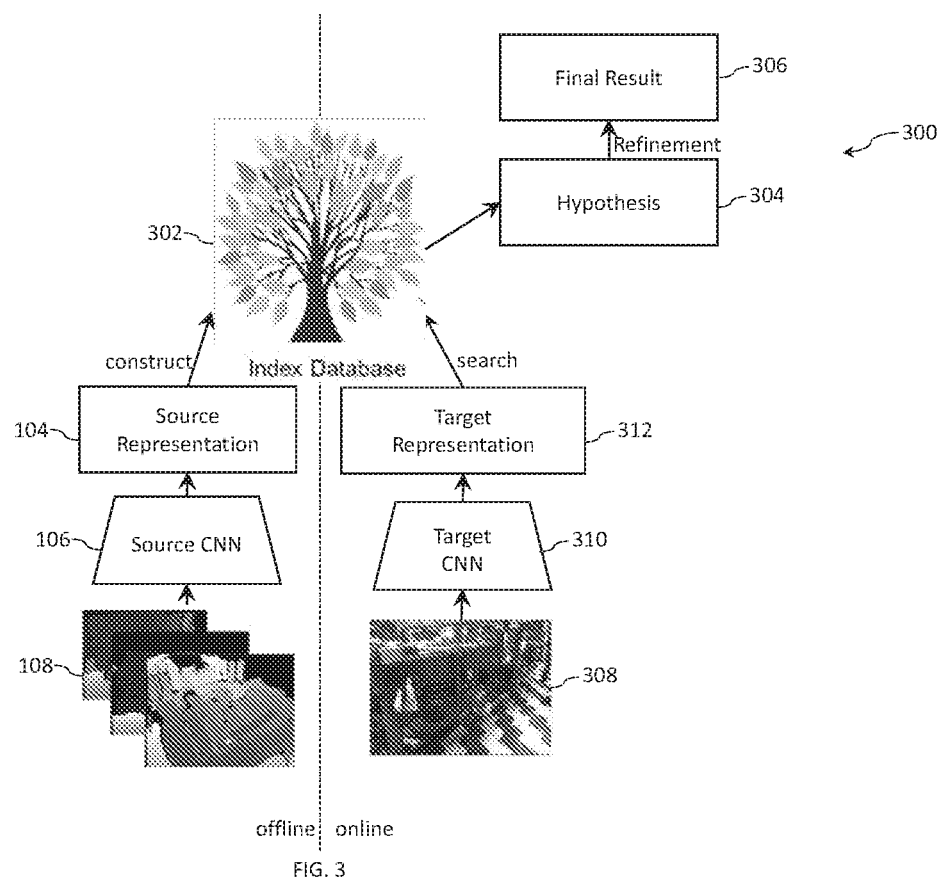
FIG. 3 is a flow diagram illustrating a run-time analytics pipeline in accordance with one or more embodiments of the present invention.

Turning now to FIG. 3, a flow diagram 300 illustrating a run-time analytics pipeline is generally shown in accordance with one or more embodiments of the present invention. In an embodiment, the pipeline shown in FIG. 3 is implemented using a computer such as computer 906 of FIG. 9 or computer 1101 of FIG. 11. After a target CNN 310 is trained using a process such as that shown in FIG. 2, it can be plugged in to replace any analytics pipeline developed for depth cameras, such as the index based pose estimation pipeline shown in FIG. 3. As shown in FIG. 3, the source representation 104 is used to construct an index database 302. In an embodiment, the index database 302 is a structured lookup table with an index that can be easily and quickly searched. In an embodiment, the index database stores a mapping between a representation and a class label (e.g., pose). As shown in FIG. 3, the construction of the index database 302 can be performed off-line.

Also as shown in FIG. 3, the target representation 312 can search the index database 302 online to generate a hypothesis 304 which may include two or more of the closest poses in the index database 302 when the exact pose is not found in the index database 302. The pose is refined, or interpolated, based on contents of the index database 302 and a final result 306 that indicates a pose of an object in the task-irrelevant real RGB image 308 is output.

Figure 4:
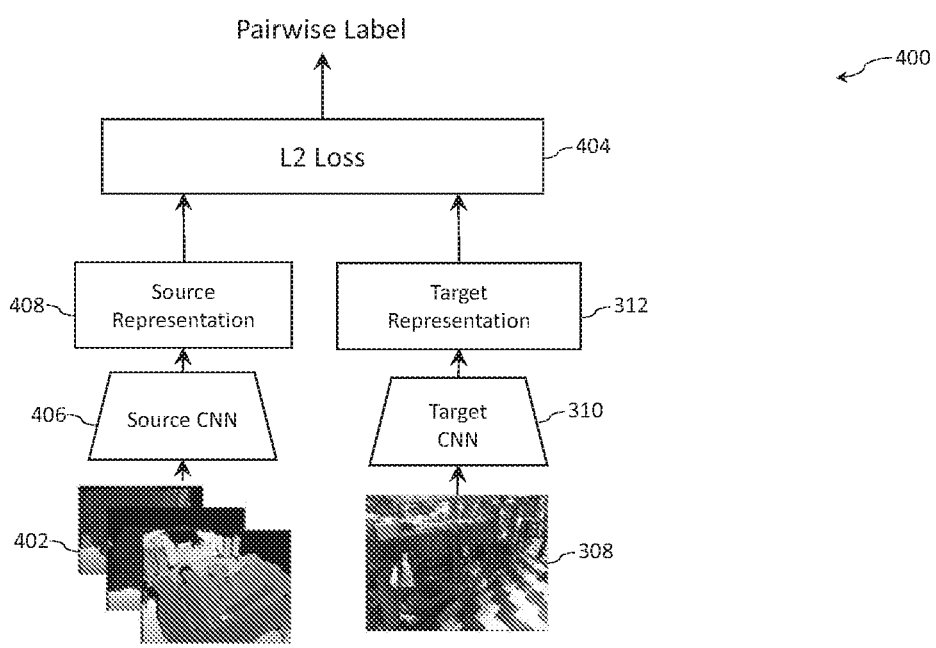
FIG. 4 is a flow diagram illustrating a method of transferring abstract features from a source domain to a target domain using L2 loss in accordance with one or more embodiments of the present invention.

Turning now to FIG. 4, a flow diagram 400 illustrating a method of transferring abstract features from a source domain to a target domain using L2 loss is generally shown in accordance with one or more embodiments of the present invention. In an embodiment, the method shown in FIG. 4 is implemented using a computer such as computer 906 of FIG. 9 or computer 1101 of FIG. 11. As shown in FIG. 4, source CNN 406, source representation 408, and L2 loss 404 are fixed, and target CNN 310 and target representation 312 are being trained using the process shown in FIG. 4. As described above, the adversarial learning based unsupervised domain adaption approach shown in FIG. 2 requires task-relevant data from the target domain. In order to remove this dependency on task-relevant data from the target domain, L2 loss can be used to transfer abstract features to task-irrelevant real depth data 402 with pairwise labels. In an embodiment, the task-irrelevant real depth data 402 includes real data from irrelevant scenes, or images, from a dataset such as, but not limited to, a SUN RGB-D dataset.

As shown in the example of FIG. 4, the source CNN 406 was previously trained using task-irrelevant real RGB-D data which includes task-irrelevant real depth data 402 and task-irrelevant real RGB images 308 captured for example, by a RGB-D sensor. In addition, task-irrelevant real RGB images 308 are input to train the target CNN 310 and to generate the target representation 312. An L2 loss 404 which takes the supervision of the pairwise label is applied to output from the source representation 408 and output from the target representation 312. In one or more embodiments, the L2 loss 404 can be replaced with any suitable loss function that encourages the similarity of the two input representations.

One drawback to using the processing shown in FIG. 4 is that it is possible that certain features cannot be identified in both domains and this may significantly degrade performance of transferring the abstract features from the source domain to the target domain. The embodiment shown in FIG. 5 overcomes this drawback by combining the two loss functions together while training.

Figure 5:
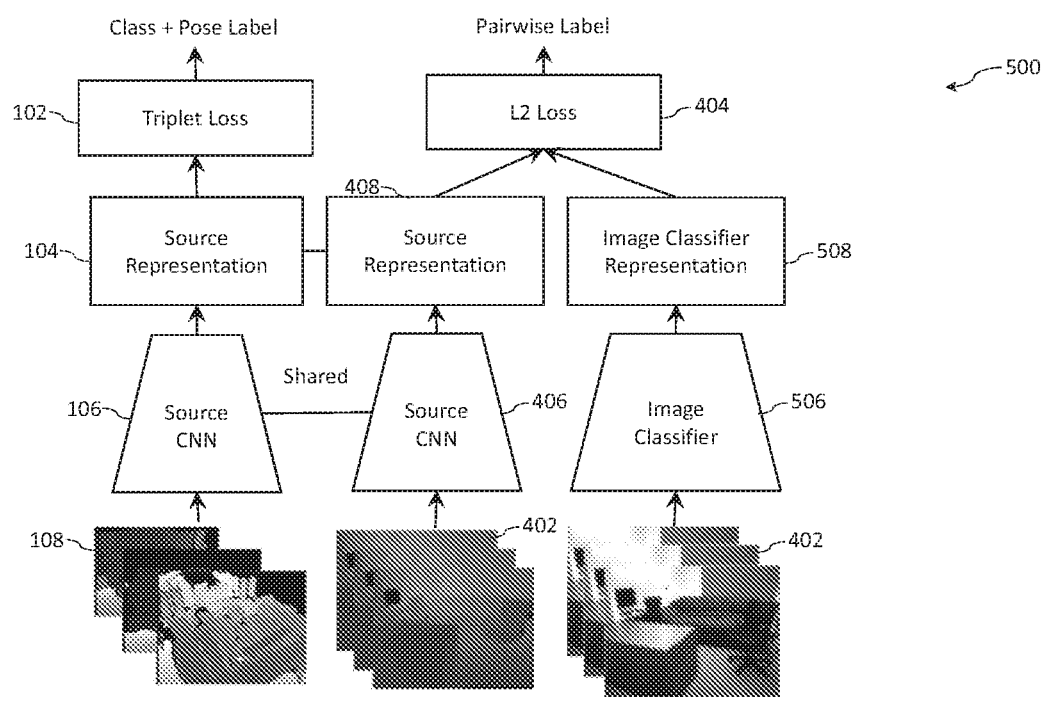
FIG. 5 is a flow diagram illustrating a joint-training pipeline integrating a target task objective function and L2 loss enforcing the extraction of abstract features shared by both source and target domains in accordance with one or more embodiments of the present invention.

Turning now to FIG. 5, a flow diagram 500 illustrating a joint-training pipeline integrating a target task objective function (e.g., identify class and poses) and L2 loss enforcing the extraction of abstract features shared by both source and target domains is generally shown in accordance with one or more embodiments of the present invention. In an embodiment, the method shown in FIG. 5 is implemented using a computer such as computer 906 of FIG. 9 or computer 1101 of FIG. 11. As shown in FIG. 5, the triplet loss 102, the L2 loss 404, image classifier 506, and image classifier representation 508 are fixed; and source representation 104, source CNN 106, source representation 408, and source CNN 406 are being trained using the process shown in FIG. 5. In an embodiment, image classifier 506 is implemented by a visual object recognition tool such as, but not limited to ImageNet.

By integrating the source training pipeline and the target training pipeline together as shown in FIG. 5 to create a joint neural network, the task of transferring abstract features from the source domain to the target domain, and optimization over the target task objective can be achieved simultaneously. The output of the training as shown in FIG. 5 is two analytics pipelines one with the source modality and the other with the target modality. This output can be used to solve the task objective (i.e., to recognize the class, or category, as well as the pose of an object in an image) effectively, even though no task-relevant data from the target domain was used throughout the training process.

Figure 6:
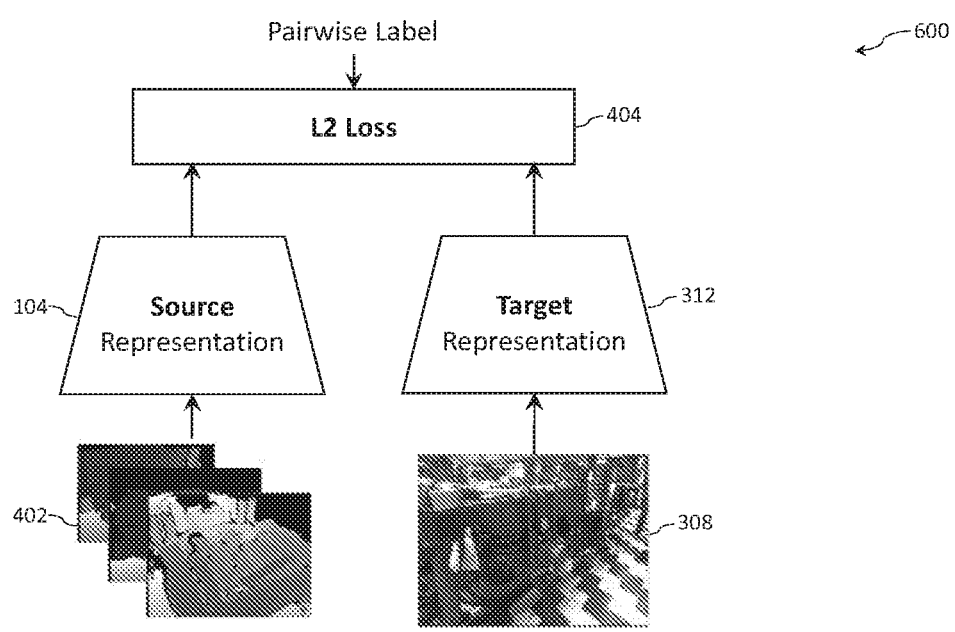
FIG. 6 is a flow diagram illustrating a method of transferring abstract features from a target domain to a source domain in accordance with one or more embodiments of the present invention.

Turning now to FIG. 6, a flow diagram illustrating a method of transferring abstract features from a target domain to a source domain is generally shown in accordance with one or more embodiments of the present invention. In an embodiment, the method shown in FIG. 6 is implemented using a computer such as computer 906 of FIG. 9 or computer 1101 of FIG. 11. The processing shown in FIG. 6 can be used in the absence of a pre-trained model or set of abstract features for the source domain. As shown in FIG. 6, instead of adapting to the target domain, the abstracted features are transferred from the target domain to the source domain. As shown in FIG. 6, target representation 312 and L2 loss 404 are fixed, and source representation 104 is being trained using the process shown in FIG. 6.

As shown in FIG. 6, the source representation 104 and the target representation 312 are trained using the task-irrelevant real RGB-D data which includes task-irrelevant real depth data 402 and task-irrelevant real RGB images 308. In an embodiment, the source representation 104 is trained to be as close to the target representation 312 as possible so that the two are interchangeable. Thus, when RGB images are not available for training, the source representation 104 can be used in place of the target representation 312.

In accordance with one or more embodiments described herein, an analytics pipeline is obtained for the source modality, as well as one for the target modality. The process shown in FIG. 7 provides a pipeline for fusing the two modalities together, which can result in more robust performance.

Figure 7:
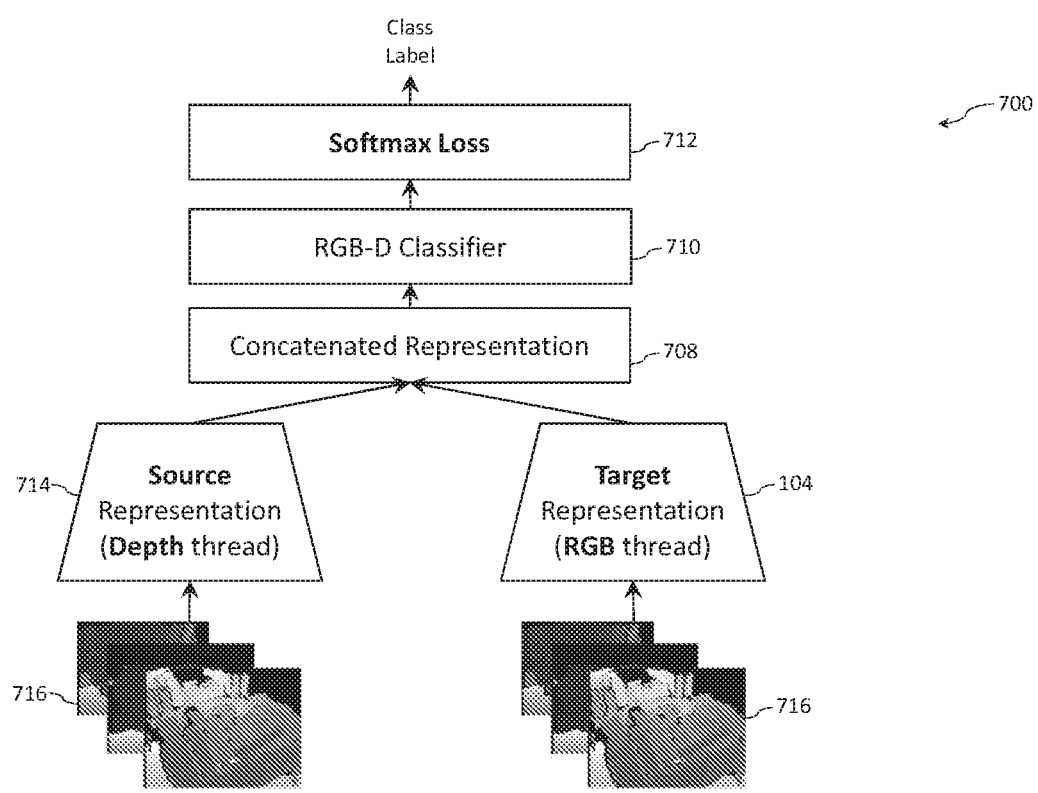
FIG. 7 is a flow diagram illustrating a method of learning the fusion of both a source modality and a target modality using a simulated target input in accordance with one or more embodiments of the present invention.

Turning now to FIG. 7, a flow diagram 700 illustrating a method of learning the fusion of both a source modality and a target modality using a simulated target input is generally shown in accordance with one or more embodiments of the present invention. In an embodiment, the method shown in FIG. 7 is implemented using a computer such as computer 906 of FIG. 9 or computer 1101 of FIG. 11. As shown in FIG. 7, the fusion pipeline is trained by concatenating the two analytics streams for the source modality (source representation 714) and the target modality (target representation 104) together to generate a concatenated representation 708, thereby optimizing the classifier over the task objective function. In contemporary fusion processes this is not feasible because the task-relevant data is needed from both of the modalities. However, in accordance with one or more embodiments of the invention described herein, the learning of abstract features shared between the modalities has already been enforced using the processing shown in FIG. 6 and the two analytics pipelines (task-irrelevant real depth data 402+ source representation 104, and task-irrelevant real RGB images 308+target representation 312) are interchangeable. This allows the output of the target representation 104 to be simulated by feeding the data from the task-relevant depth data 716 through the source analytics pipeline shown in FIG. 6 (source representation 104), which can generate similar features as if the data is being fed from the target domain through the target analytics pipeline (target representation 312 of FIG. 6). In order to explore the potential from the source domain fully, without the constraint that only the shared abstract features should be utilized, the thread of the target analytics (simulated target analytics pipeline, target representation 104 in FIG. 7) can be fixed, and the source analytics pipeline (source representation 714 in FIG. 7) can be refined to further optimize the overall performance.

As shown in FIG. 7, a task-relevant real depth data 716 is input to the source representation and task-relevant real depth data 716 is input to a source representation 104 which as shown in FIG. 7 is used as the target representation of the RGB, or target domain. This allows the use of simulated data RGB data to train the RGB-D classifier 710 in the absence of RGB image data.

As shown in FIG. 7, output from the source representation 714 and the target representation 104 concatenated representation 708, which is input to an RGB-D classifier 710 is trained using the softmax loss 712 as the objective function and supervised by the class label at training time. At testing time, there will be no softmax loss 712, and the RGB-D classifier 710 directly outputs the predicted class label. In an embodiment, at training time, either one of the task-relevant real depth data 716 that is input to the target representation 104 can optionally include empty inputs to simulate missing data and/or noise.

Figure 8:
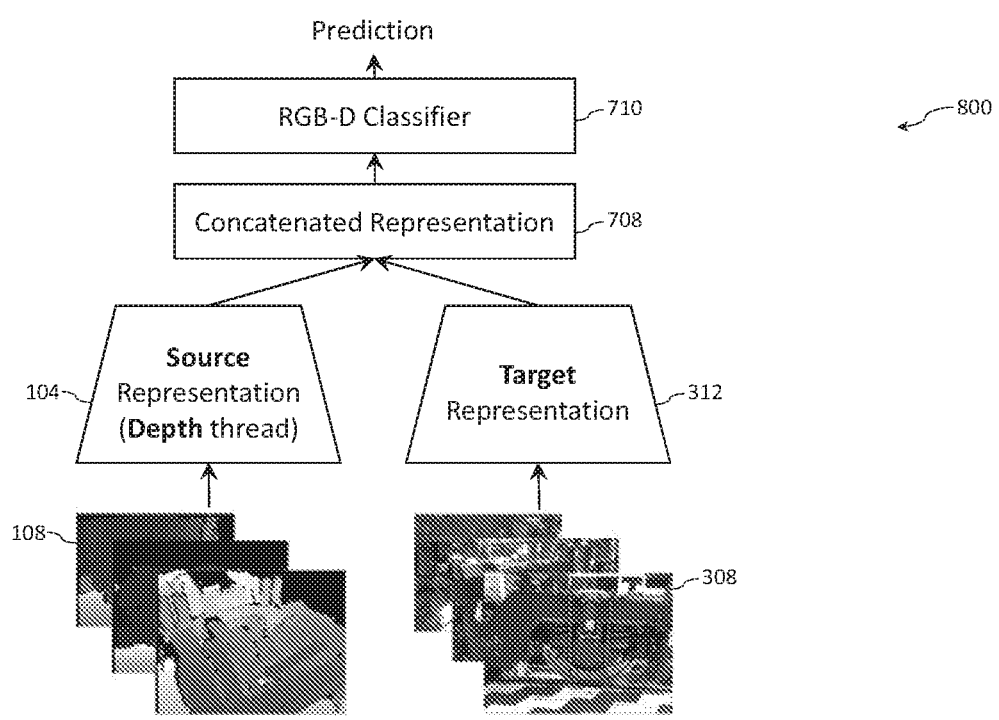
FIG. 8 is a flow diagram illustrating a testing time pipeline of fusing using both a source modality and a target modality in accordance with one or more embodiments of the present invention.

Turning now to FIG. 8, a flow diagram 800 illustrating a testing time pipeline of fusing using both a source modality and a target modality is generally shown in accordance with one or more embodiments of the present invention. In an embodiment, the pipeline shown in FIG. 8 is implemented using a computer such as computer 906 of FIG. 9 or computer 1101 of FIG. 11. After learning the fusion analytics pipeline, the simulated target analytics pipeline can be changed back to the real target analytics pipeline when real data from the target domain, including task-irrelevant real RGB images 308 are available for input. As shown in FIG. 8, the RGB-D classifier 710 outputs a prediction, or class label.

It is understood in advance that although this disclosure describes the domain adaptation and fusion using weakly supervised target-irrelevant data in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 9:
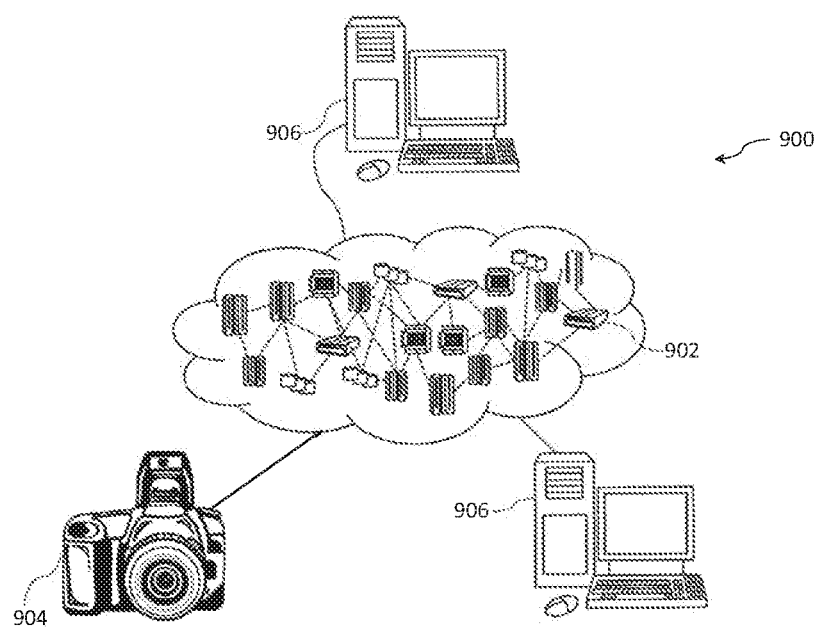
FIG. 9 is a schematic illustration of a cloud computing environment in accordance with one or more embodiments of the present invention.

Referring now to FIG. 9, an illustrative cloud computing environment 900 is depicted. As shown, cloud computing environment 900 comprises one or more cloud computing nodes 902 with which local computing devices used by cloud consumers, such as, for example, camera 904, computer 906, and computer 906. In an embodiment, at least one of the computers 906 implements an IPS system as described previously. Nodes 902 may communicate with one another. They may be grouped (not shown) physically or virtually, in one or more networks, such as private, community, public, or hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904-910 shown in FIG. 9 are intended to be illustrative only and that computing nodes 902 and cloud computing environment 900 can communicate with any type of computerized device over any type of network and/or network addressable connection (e.g., using a web browser).

Figure 10:
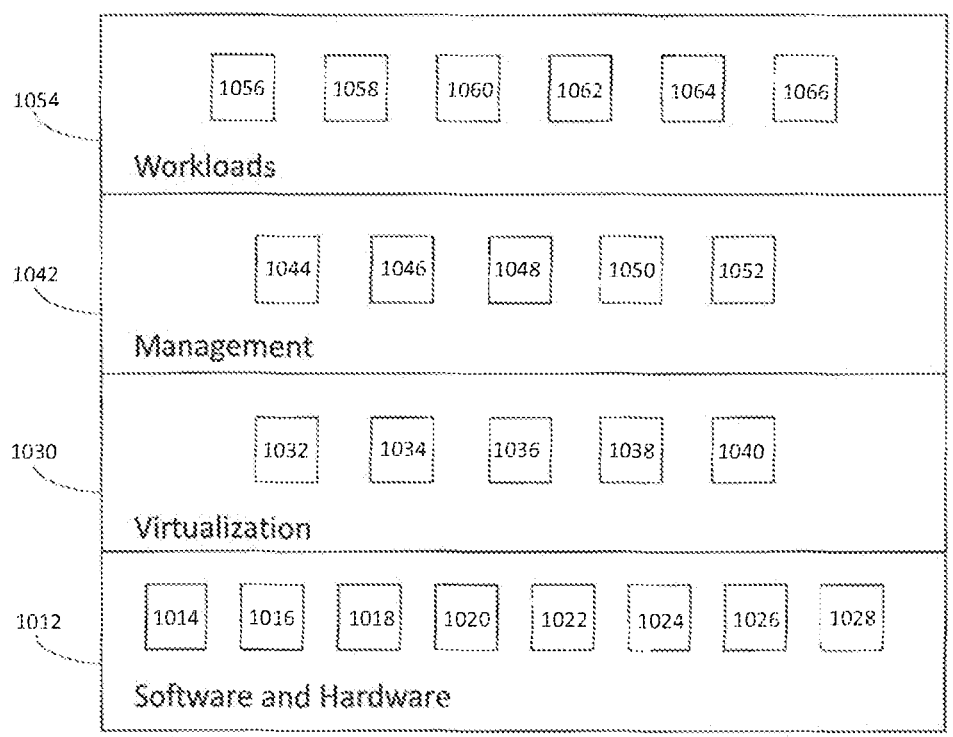
FIG. 10 is a schematic illustration of abstraction model layers in accordance with one or more embodiments of the present invention.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided: hardware and software layer 1012 includes hardware and software components. Examples of hardware components include: mainframes 1014; RISC (Reduced Instruction Set Computer) architecture based servers 1016; servers 1018; blade servers 1020; storage devices 1022; and networks and networking components 1024. In some embodiments, software components include network application server software 1026 and database software 1028; virtualization layer 1030 provides an abstraction layer from which the following examples of virtual entities may be provided: virtual servers 1032; virtual storage 1034; virtual networks 1036, including virtual private networks; virtual applications and operating systems 1038; and virtual clients 1040.

In one example, management layer 1042 may provide the functions described below. Resource provisioning 1044 provides dynamic procurement of computing resources and other resources that are utilized to perform tasks within the cloud computing environment. Metering and pricing 1046 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1048 provides access to the cloud computing environment for consumers and system administrators. Service level management 1050 provides cloud computing resource allocation and management such that required service levels are met. Service Level Agreement (SLA) planning and fulfillment 1052 provides pre-arrangement for, and procurement of, cloud computing resources for which a future requirement is anticipated in accordance with an SLA.

Workloads layer 1054 provides examples of functionality for which the cloud computing environment may be utilized. Examples of workloads and functions that may be provided from this layer include: mapping and navigation 1056; software development and lifecycle management 1058; transaction processing 1060; point cloud to virtual reality data processing 1064; user defined content to point cloud processing 1066; and domain adaptation and fusion processing 1068.

Figure 11:
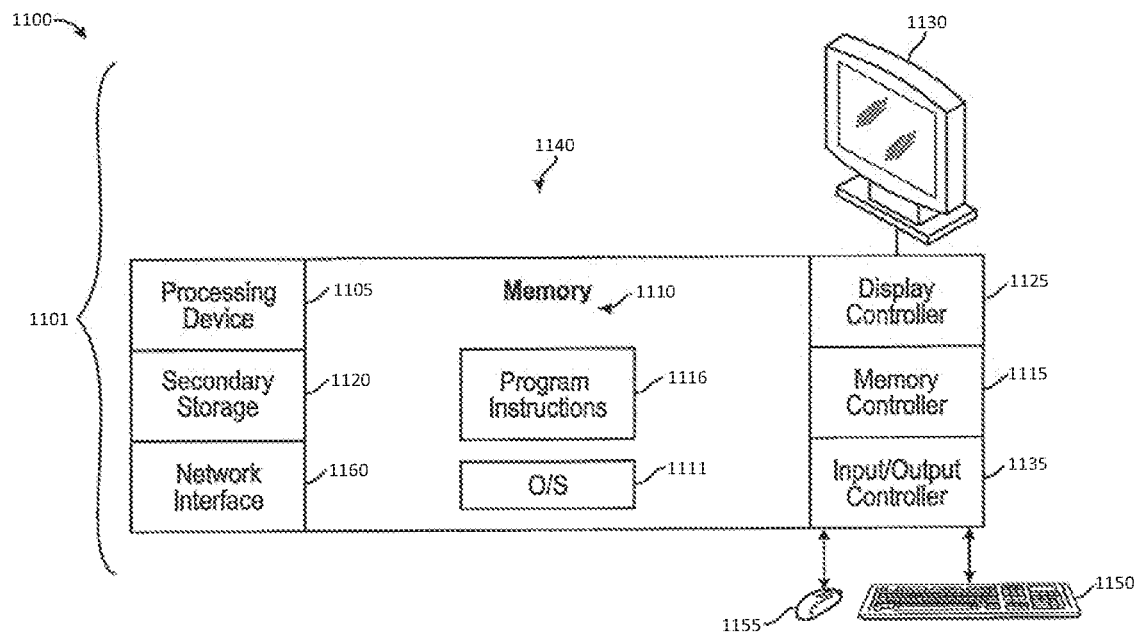
FIG. 11 is a schematic illustration of a computer system in accordance with one or more embodiments of the present invention.

Turning now to FIG. 11, a schematic illustration of a system 1100 is depicted upon which aspects of one or more embodiments of domain adaption and fusion using weakly supervised target-irrelevant data may be implemented. In an embodiment, all or a portion of the system 1100 may be incorporated into one or more of the camera and processors described herein. In one or more exemplary embodiments, in terms of hardware architecture, as shown in FIG. 11, the computer 1101 includes a processing device 1105 and a memory 1110 coupled to a memory controller 1115 and an input/output controller 1135. The input/output controller 1135 can be, for example, but not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the computer 1101 may include address, control, and/or data connections to enable appropriate communications among the aforementioned components.

In one or more exemplary embodiments, a keyboard 1150 and mouse 1155 or similar devices can be coupled to the input/output controller 1135. Alternatively, input may be received via a touch-sensitive or motion sensitive interface (not depicted). The computer 1101 can further include a display controller 1125 coupled to a display 1130. It should be appreciated that a camera (e.g., camera 904 of FIG. 9) may be coupled to the system 1100.

The processing device 1105 is a hardware device for executing software, particularly software stored in secondary storage 1120 or memory 1110. The processing device 1105 can be any custom made or commercially available computer processor, a central processing unit (CPU), an auxiliary processor among several processors associated with the computer 1101, a semiconductor-based microprocessor (in the form of a microchip or chip set), a macroprocessor, or generally any device for executing instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 1110 may incorporate electronic, magnetic, optical, and/or other types of storage media. Accordingly, the memory 1110 is an example of a tangible computer readable storage medium 1140 upon which instructions executable by the processing device 1105 may be embodied as a computer program product. The memory 1110 can have a distributed architecture, where various components are situated remote from one another, but can be accessed by the processing device 1105.

The instructions in memory 1110 may include one or more separate programs, each of which comprises an ordered listing of executable instructions for implementing logical functions. In the example of FIG. 11, the instructions in the memory 1110 include a suitable operating system (OS) 1111 and program instructions 1116. The operating system 1111 essentially controls the execution of other computer programs and provides scheduling, input-output control, file and data management, memory management, and communication control and related services. When the computer 1101 is in operation, the processing device 1105 is configured to execute instructions stored within the memory 1110, to communicate data to and from the memory 1110, and to generally control operations of the computer 1101 pursuant to the instructions. Examples of program instructions 1116 can include instructions to implement the processing described herein in reference to FIGS. 1-10.

The computer 1101 of FIG. 11 also includes a network interface 1160 that can establish communication channels with one or more other computer systems via one or more network links. The network interface 1160 can support wired and/or wireless communication protocols known in the art. For example, when embodied in a user system, the network interface 1160 can establish communication channels with an application server.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, GPU devices, computing devices, microcontrollers, digital signal processors, or like devices, as further described herein. A CPU typically performs a variety of tasks while a GPU is optimized to display images.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A method comprising:
   receiving, by a system comprising one or more processors, a request to perform an image classification task in a target domain, the image classification task including identifying a feature in images in the target domain;
   transferring classification information related to the feature from a source domain contained in a source neural network to the target domain, the transferring comprising:
   receiving a plurality of pairs of task-irrelevant images, each image pair comprising a task-irrelevant image in the source domain and a task-irrelevant image in the target domain, the task-irrelevant image in the source domain having a fixed correspondence to the task-irrelevant image in the target domain; and
   training the source neural network based at least in part on labeled images in the source domain and concurrently training a target neural network to perform the image classification task in the target domain, the training based on the plurality of pairs of task-irrelevant images; and
   performing the image classification task in the target domain, the performing including applying the target neural network to an image in the target domain and outputting an identified feature.

2. The method of claim 1, wherein the fixed correspondence is a spatial relation.

3. The method of claim 1, wherein the labeled images in the source domain include task-relevant images in the source domain.

4. The method of claim 3, wherein labeled images in the source domain include simulated data.

5. The method of claim 1, further comprising training a joint neural network using only the pairs of task-irrelevant images and task-relevant labeled data in the source domain.

6. The method of claim 1, wherein the request is received from an integrated perception system (IPS) that monitors a geographic location and the identified feature is output to the IPS.

7. A system comprising:
   a memory having computer readable instructions; and
   one or more processors for executing the computer readable instructions, the computer readable instructions controlling the one or more processors to perform operations comprising:
   receiving a request to perform an image classification task in a target domain, the image classification task including identifying a feature in images in the target domain;
   transferring classification information related to the feature from a source domain contained in a source neural network to the target domain, the transferring comprising:

receiving a plurality of pairs of task-irrelevant images, each image pair comprising a task-irrelevant image in the source domain and a task-irrelevant image in the target domain, the task-irrelevant image in the source domain having a fixed correspondence to the task-irrelevant image in the target domain; and training the source neural network based at least in part on labeled images in the source domain and concurrently training a target neural network to perform the image classification task in the target domain, the training based on the plurality of pairs of task-irrelevant images; and performing the image classification task in the target domain, the performing including applying the target neural network to an image in the target domain and outputting an identified feature.

8. The system of claim 7, wherein the fixed correspondence is a spatial relation.

9. The system of claim 7, wherein the labeled images in the source domain include task-relevant images in the source domain.

10. The system of claim 9, wherein labeled images in the source domain include simulated data.

11. The system of claim 7, wherein the operations further comprise training a joint neural network using only the pairs of task-irrelevant images and task-relevant labeled data in the source domain.

12. The system of claim 7, wherein the request is received from an integrated perception system (IPS) that monitors a geographic location and the identified feature is output to the IPS.

13. A computer program product comprising a non-transitory computer readable storage medium having program instructions embodied therewith, the program instructions executable by a processor to cause the processor to perform operations comprising:

receiving a request to perform an image classification task in a target domain, the image classification task including identifying a feature in images in the target domain;

transferring classification information related to the feature from a source domain contained in a source neural network to the target domain, the transferring comprising:

receiving a plurality of pairs of task-irrelevant images, each image pair comprising a task-irrelevant image in the source domain and a task-irrelevant image in the target domain, the task-irrelevant image in the source domain having a fixed correspondence to the task-irrelevant image in the target domain; and training the source neural network based at least in part on labeled images in the source domain and concurrently training a target neural network to perform the image classification task in the target domain, the training based on the plurality of pairs of task-irrelevant images; and performing the image classification task in the target domain, the performing including applying the target neural network to an image in the target domain and outputting an identified feature.

14. The computer program product of claim 13, wherein the operations further comprise training a joint neural network using only the pairs of task-irrelevant images and task-relevant labeled data in the source domain.

* * * * *